UNITED STATES PATENT OFFICE.

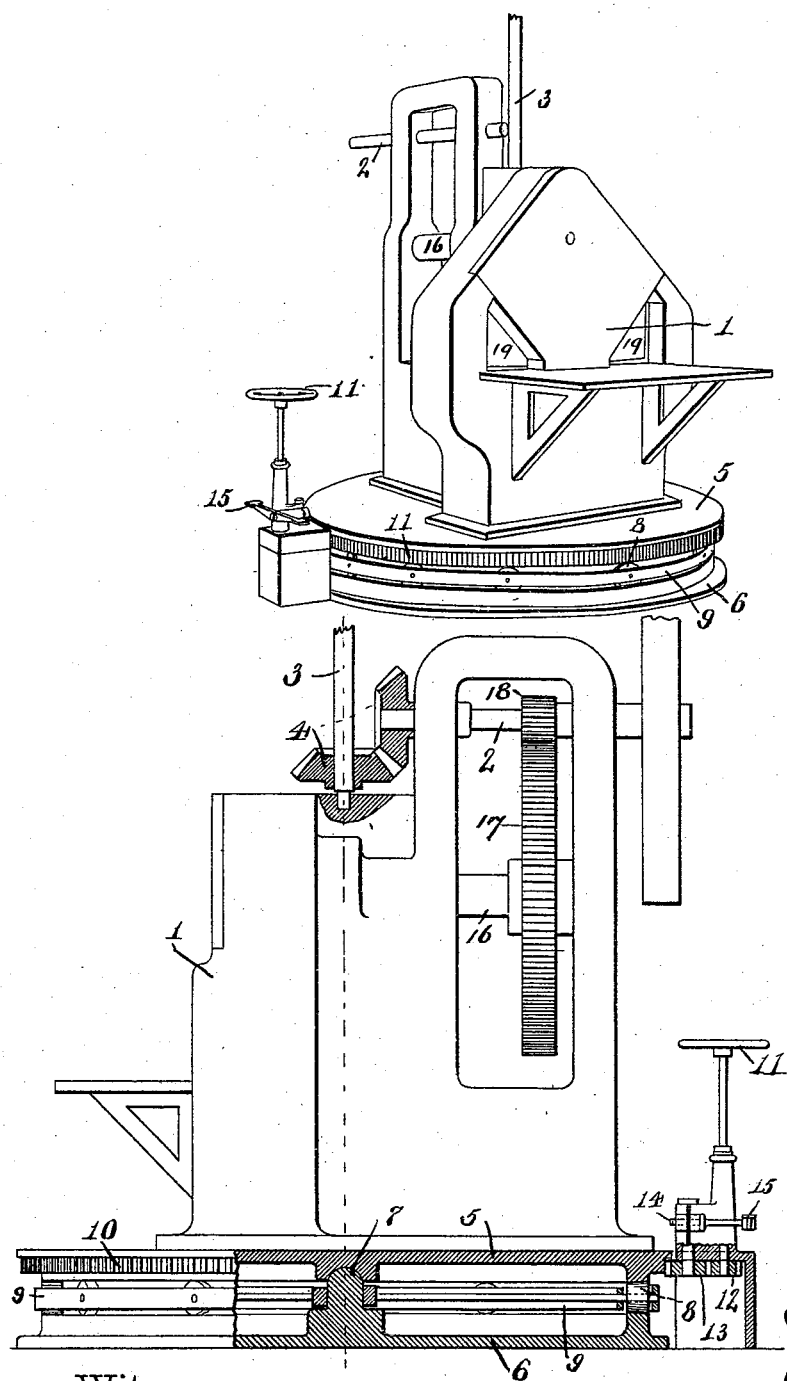

JOHN M. LONG, OF HAMILTON, OHIO.

SHEARING-MACHINE.

SPECIFICATION forming part of Letters Patent No. 479,122, dated July 19, 1892.

Application filed August 29, 1891. Serial No. 404,153. (No model.)

*To all whom it may concern:*

Be it known that I, JOHN M. LONG, of Hamilton, Butler county, Ohio, have invented certain new and useful Improvements in Shearing-Machines, &c., of which the following is a specification.

Assume that I have a long bar of structural iron—say angle-iron—whose two ends I wish to shear off square. I present the end of this bar to a shearing-machine and I then turn the bar end for end and shear again. To turn a long bar end for end requires a great deal of room, and much inconvenience is experienced on that account in dealing with the very long bars now in common use. Again, assume that I wish to shear the end of the bar at an angle, say, to form a miter. I now present the bar angularly to the shearing-machine, and in this case, without any question of turning the bar around, would require a large amount of room in adjusting the bar sidewise to get the angular presentation. It has come to be a recognized fact that shearing-machines for thus cutting the ends of long bars at angles must be located in a large and clear field for operations. The same would be the case with certain kinds of punching done upon the ends of long bars, much room being required in swinging the bars for angular presentation or in turning them end for end. I overcome these troubles by mounting the machine to swivel upon a vertical axis, so that it can work angularly upon bars, and in the preferred construction of machine so that the two ends of the bar can be worked on by turning the machine around and shifting the bar its length endwise.

My improvements will be readily understood from the following description, taken in connection with the accompanying drawings, in which—

Figure 1 is a perspective view illustrating my invention as exemplified in an angle-iron-shearing machine, the driving-gearing of the machine being omitted; and Fig. 2, a side elevation of the machine with the turn-table shown part in diametrical section.

In the drawings, 1 indicates an ordinary angle-iron-shearing machine; 2, one of the driving-shafts thereof; 3, a vertical shaft through which power is transmitted to the machine, this shaft being arranged in the axis of rotation of the turn-table; 4, a bevel-gearing connecting shafts 3 and 2; 5, a rotary sole-plate or turn-table on which the shearing-machine is mounted; 6, a foundation-plate, 7, a central pivot on which the sole-plate and shearing-machine may rotate upon the foundation-plate, the axis of this pivot being in line with the axis of the vertical shaft 3; 8, an annular series of rollers arranged between the sole-plate and the foundation-plate; 9, a spider to carry these rollers; 10, an annular series of gear-teeth around the sole-plate; 11, a hand-wheel and spindle for turning the sole-plate, this spindle being mounted in a fixed bearing near the edge of the sole-plate; 12, a pinion on this spindle; 13, a pinion gearing with the pinion 12 and with the teeth of the sole-plate and having its spindle carried in a split clamp-bearing; 14, a screw arranged to clamp this bearing upon its spindle, so as to lock the spindle against rotation; 15, a lever on this screw for turning it sufficiently in either direction to either clamp or loosen the split bearing on its spindle; 16, the usual cam-shaft for giving motion to the shear-blades; 17, the usual gear thereon; 18, the usual pinion on shaft 2 to transmit motion to spur-gear 17, and 19 the usual shear-blades reciprocating in a vertical plane, a plane always parallel to the vertical axis of rotation of the machine.

The general operation of the shearing-machine is as usual, the machine fronting in whatever direction may be most desirable and permanently used in such condition of frontage unless long work may call for a readjustment or unless a new direction of fronting may become desirable for any reason, which may control the direction of fronting of a shearing-machine, in which case the entire machine may be readily turned as desired by operating the hand-wheel and locked by means of the screw. If a long bar is to be sheared square, it is presented squarely to the machine, as usual, projecting at right angles from its front. If, however, the end of the bar is to be sheared at an angle, then, instead of swinging the bar as usual, the machine is turned to the proper angle and the bar presented parallel with the position it occupied in the assumed square-shearing operation. If one end of the long bar has been sheared either square or at an angle and we desire to shear the other end, I do not turn the bar end for end, but I turn the machine entirely around and pass the bar endwise past the machine and then present its second end to the machine. By this system of machine the operations upon the longest bars require only the side room taken up by the machine itself, as against the very extended room required in turning long bars end for end.

It is of course to be understood that the type of shearing-machine illustrated and the mechanism for transmitting operating motion to it is merely exemplifying in character and may be varied without departing from my invention. So, also, the mechanism illustrated for rotating the turn-table is merely exemplifying in character, but it will be found admirable. The intermediate pinion 13 is a mere expedient for getting the pinion 12 a further distance from the edge of the turn-table to give more turning room.

In many cases the system will be found of great utility even when the machine is not arranged to turn completely around—as, for instance, where provision is sought to be made only for overcoming the objection to the angular presentation of long bars to the machine—and it is obvious that the system lends itself to any of the usual means by which the operating motions are imparted to the shearing-machine, whether the motions be imparted by hand or by shafting or by directly-attached motor.

I claim as my invention—

1. The combination, substantially as set forth, of a turn-table mounted for rotation on a vertical axis, a locking device to secure the same in adjusted position, a shearing-machine mounted on the turn-table, and a shear-blade mounted in the shearing-machine and arranged to reciprocate in a vertical plane.

2. The combination, substantially as set forth, with a shearing-machine and mechanism for imparting operative motion to it in any position of rotary adjustment upon a vertical axis, of a foundation-plate below such machine, a sole-plate under said machine and over said foundation-plate and connected to the foundation-plate by a vertical axis of rotation, and means for rotating said sole-plate.

JOHN M. LONG.

Witnesses:
J. W. SEE,
I. N. SLAYBACK.